UNITED STATES PATENT OFFICE.

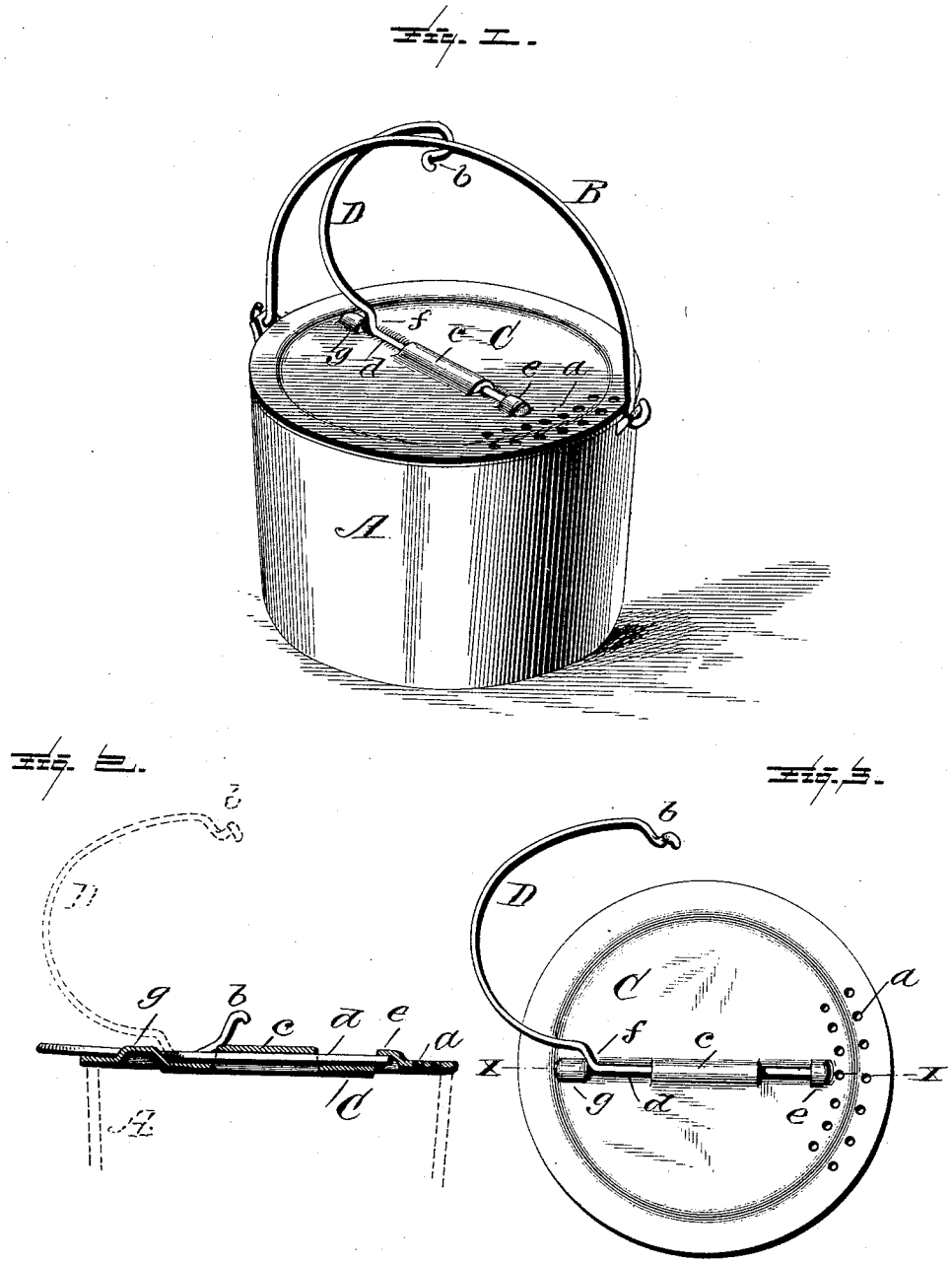

JESSE SHILLING, JR., OF TROY, OHIO.

KETTLE-COVER.

SPECIFICATION forming part of Letters Patent No. 484,824, dated October 25, 1892.

Application filed April 30, 1892. Serial No. 431,304. (No model.)

*To all whom it may concern:*

Be it known that I, JESSE SHILLING, Jr., a citizen of the United States, residing at Troy, in the county of Miami and State of Ohio, have invented certain new and useful Improvements in Kettle-Covers; and I do hereby declae that the following is a full, clear, and exact description of the same, reference being had to the annexed drawings, making a part of this specification, and to the letters of reference marked thereon.

Figure 1 of the drawings represents a perspective view of a kettle, showing in position thereon the cover and fastening device, the latter being shown as engaged with the bail of the kettle to hold the cover in place; Fig. 2, a vertical section of the cover, taken on line $xx$ of Fig. 3, the fastening device being shown in full lines as in a horizontal position and in dotted lines in an elevated position; Fig. 3, a top plan view of the cover and fastening device brought down against the same in a horizontal position, the same as is shown in full lines in Fig. 2.

The present invention has for its object to provide a cover for kettles with a simple device for holding the same in position thereon, said device engaging with the bail of the kettle, which holds the cover stationary; and the invention consists in the details of construction substantially as shown in the drawings, and hereinafter described and claimed.

In the accompanying drawings, A represents a kettle of any of the usual forms, and is provided with the usual bail B, and C represents the cover thereto, of any desirable construction, but preferably with perforations, as shown at $a$, near its edge, so as to form a strainer in pouring off the water from the kettle.

To the top of the cover C is suitably hinged or pivoted thereto the fastening device, which consists of a spring-arm D of wire bent in a curved shape, as shown, and at its upper or free end is hooked to form a seat $b$ for the bail B of the kettle, thus holding the bail up in a vertical position and from contact therewith, so as to prevent it from becoming hot when the kettle is on the fire.

The kettle-cover C is struck up out of sheet metal with a sleeve $c$, through which the shank $d$ of the fastening device passes, and the extremity of the shank enters a socket $e$, while the shank is bent to form an elbow $f$, which abuts against a shoulder $g$, struck up from the metal of the cover, whereby the device is held in attachment with the cover.

The fastening device above described will hold the cover securely in place on the kettle, as well as holding the bail thereof in an upright position to prevent it from becoming hot.

The peculiar bend at the free end of the spring-arm D to form a seat for the bail enables the fastening device to be used in any position with equal effect.

I do not wish to be understood as limiting myself to kettles, as the fastening device may be applied to covers for any kind of receptacles or vessels, such as pails, tubs, buckets, and the like. The handle or bail of the kettle being held away from contact with the sides of the kettle when on the stove is therefore prevented from becoming hot, and can be handled without danger of burning the hands when removing the kettle from the stove or tipping the kettle to drain the contents or remove the same therefrom.

The hinging or pivoting of the fastening device to the cover enables it to brought in a horizontal position fast upon the cover, as shown in Fig. 3, thus economizing space in packing and transportation; but so far as the practical operation of the fastening device is concerned relative to the handle or bail of the vessel, it may be connected to the cover in any desirable manner, either rigid or pivoted or hinged, as found desirable.

Having now fully described my invention, what I claim as new, and desire to secure by Letters Patent, is—

A cover for kettles or other vessels, provided with a curved spring-arm pivoted or hinged thereto, said arm consisting of a spring-wire bent to have substantially the same curve as the bail of the vessel and extending in the same direction or parallel therewith when the cover is in position and having its outer or free end extending laterally to the length of the arm and curved to form a seat, whereby the seat can be sprung under the bail when the latter is elevated, and thus hold the cover securely in place, substantially as and for the purpose set forth.

In testimony that I claim the above I have hereunto subscribed my name in the presence of two witnesses.

JESSE SHILLING, Jr.

Witnesses:
J. W. ROTHERMEL,
MARY J. ORBISON.